Figure 9:
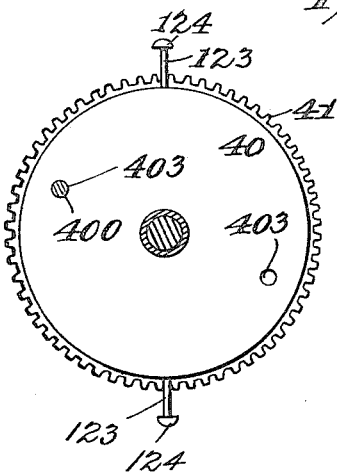

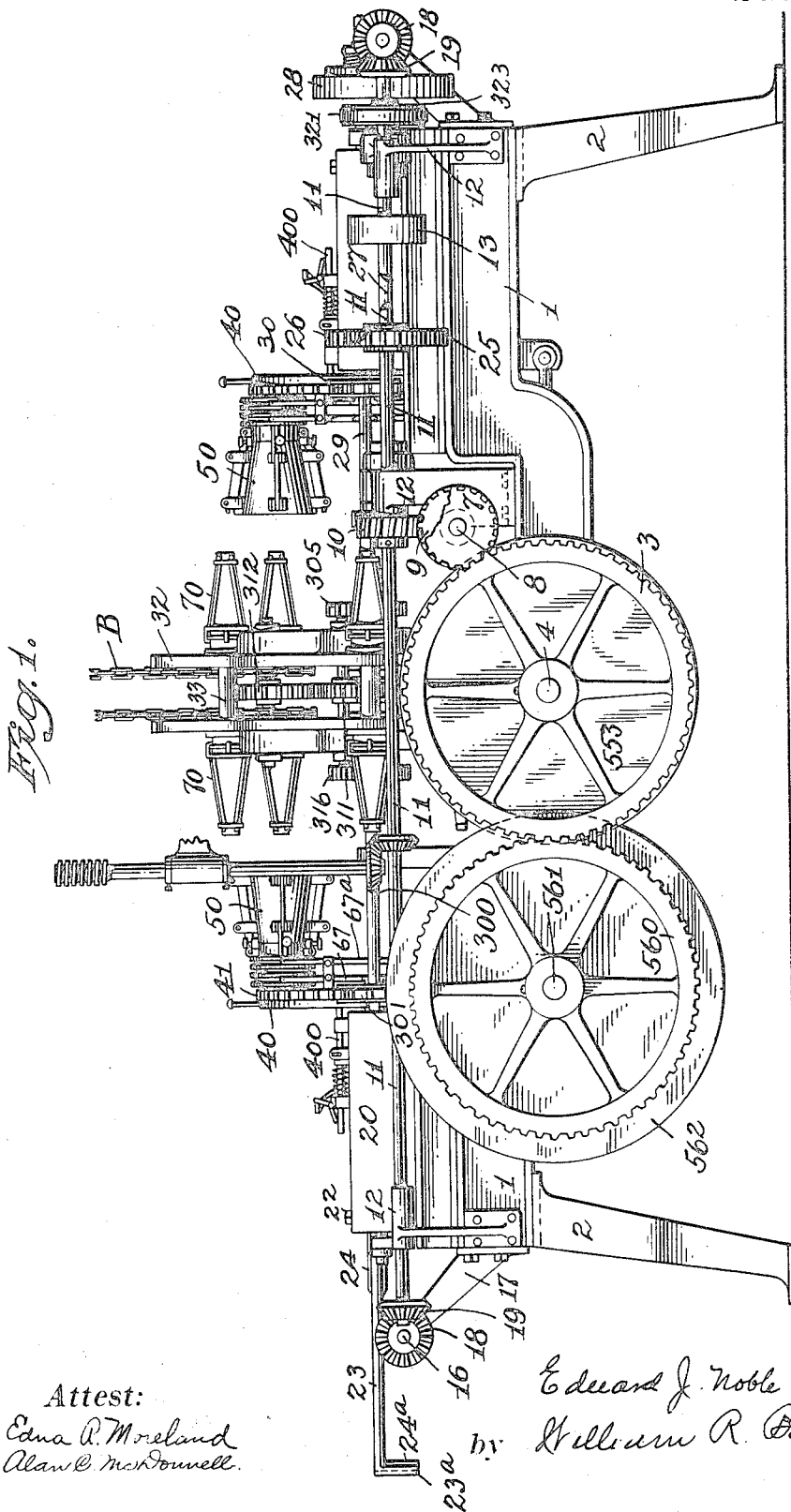

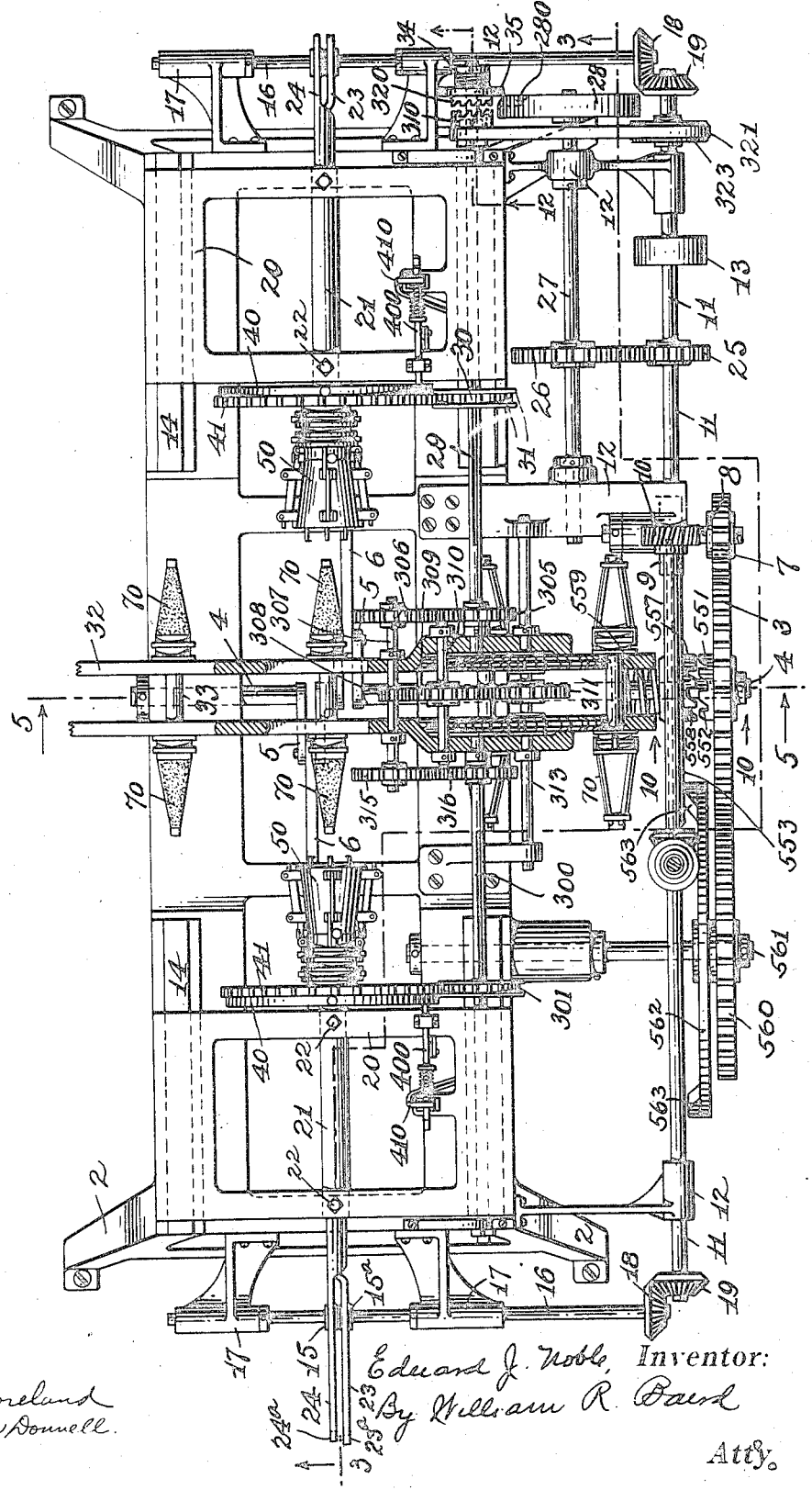

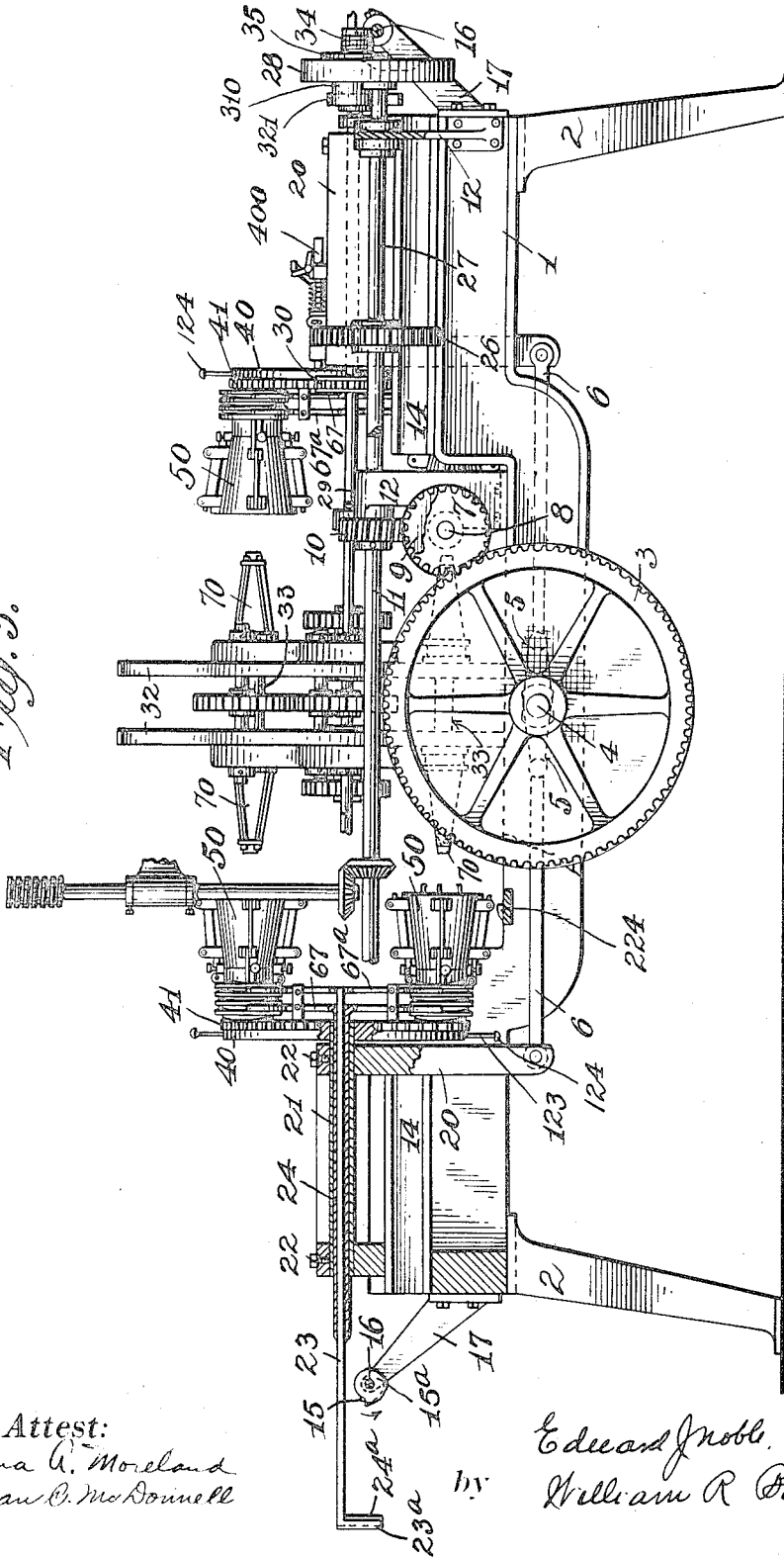

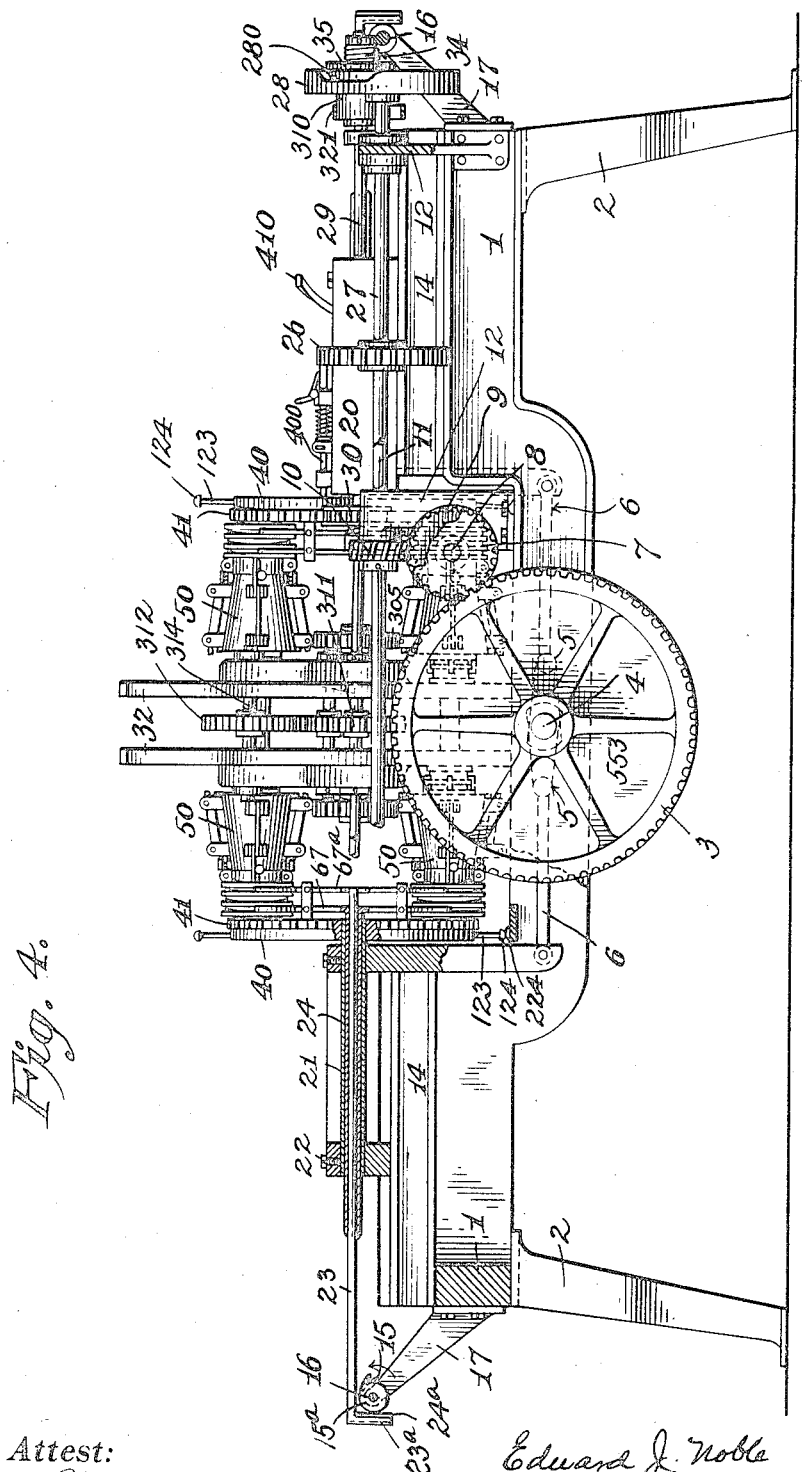

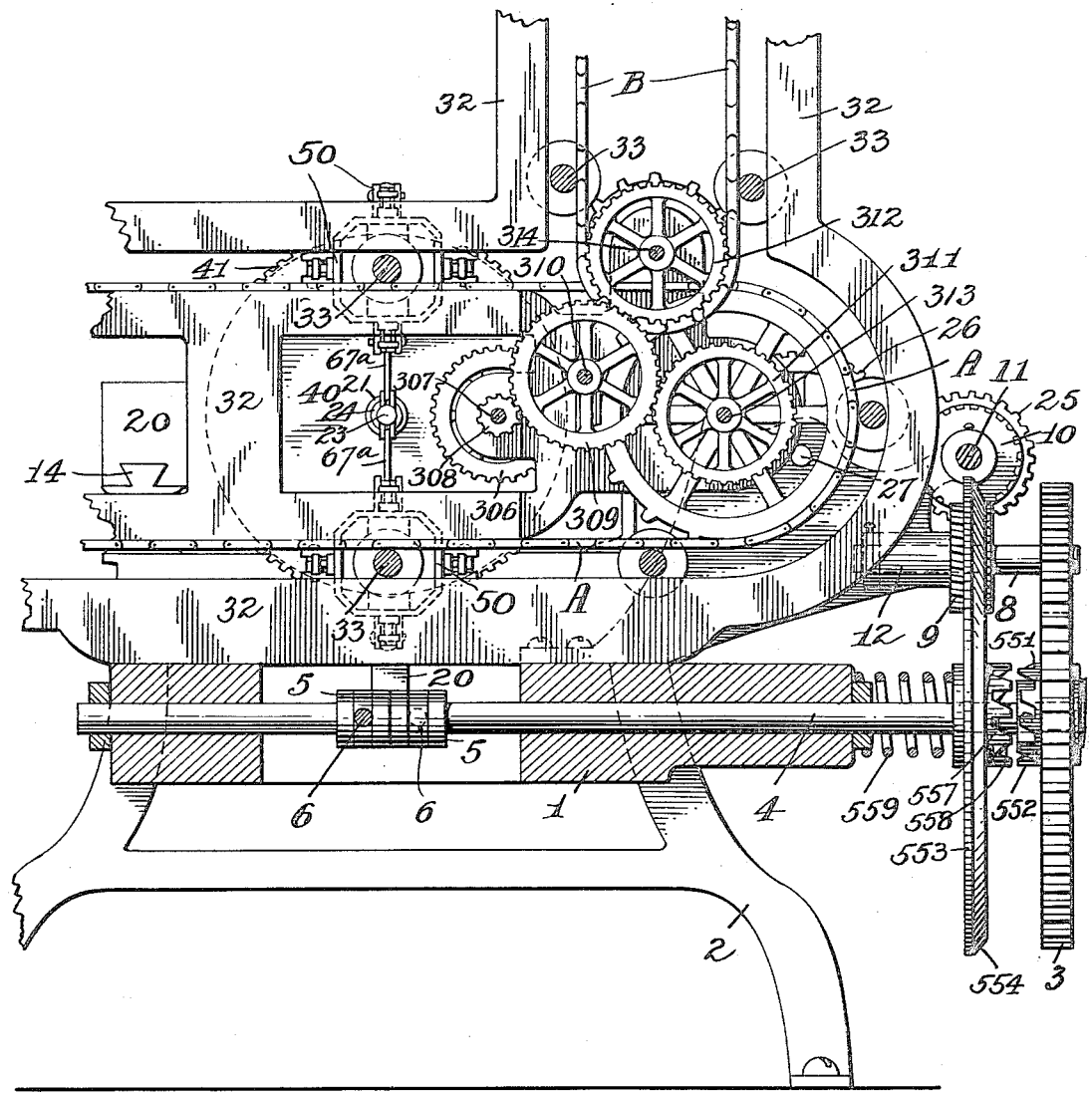

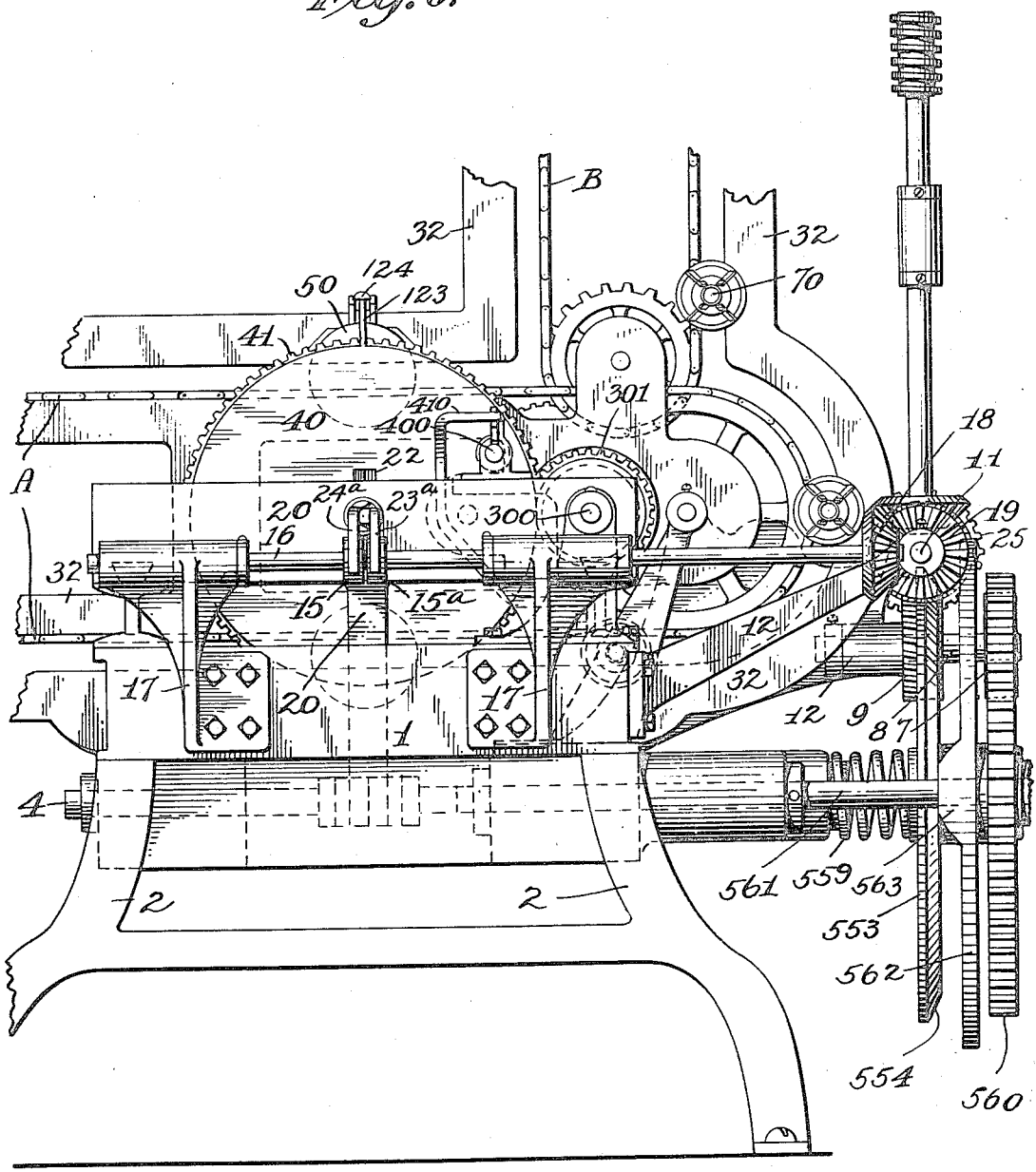

E. J. NOBLE.
MOLDING OR SHAPING MACHINE.
APPLICATION FILED SEPT. 13, 1912.

1,146,812.

Patented July 20, 1915.
12 SHEETS—SHEET 7.

Attest:
Edna A. Moreland
Alan C. McDonnell

Edward J. Noble, Inventor:
by William R. Baird
Atty

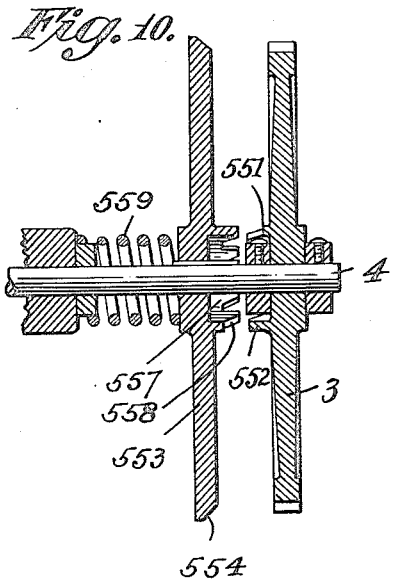
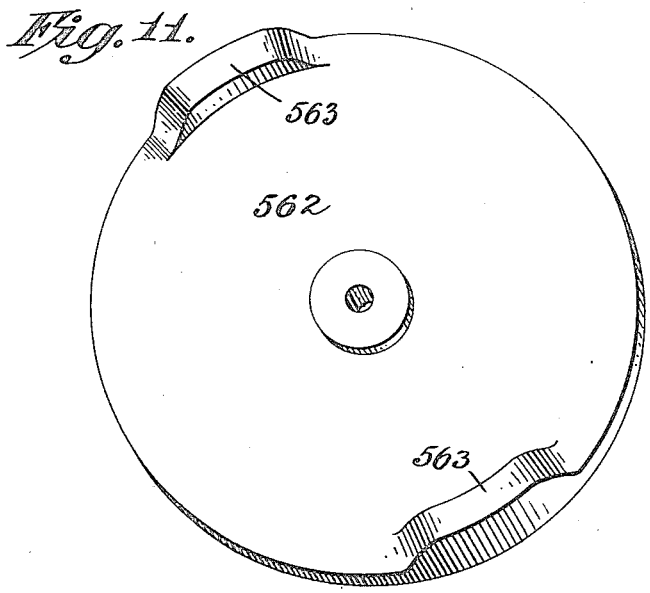
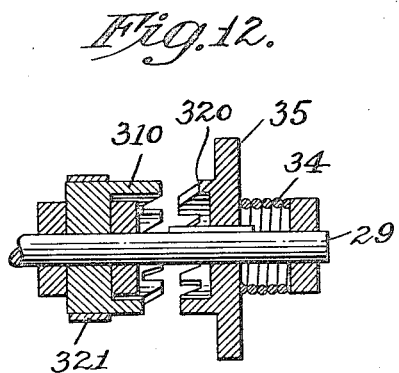
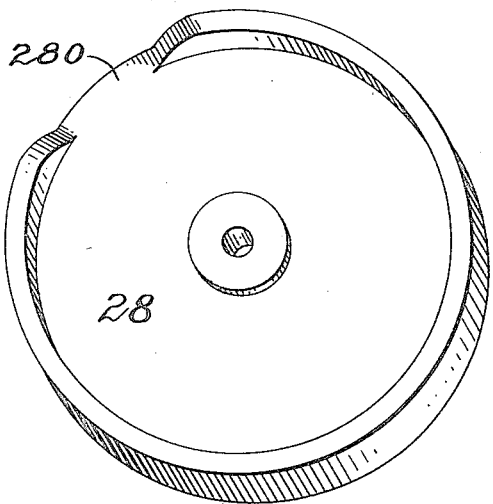

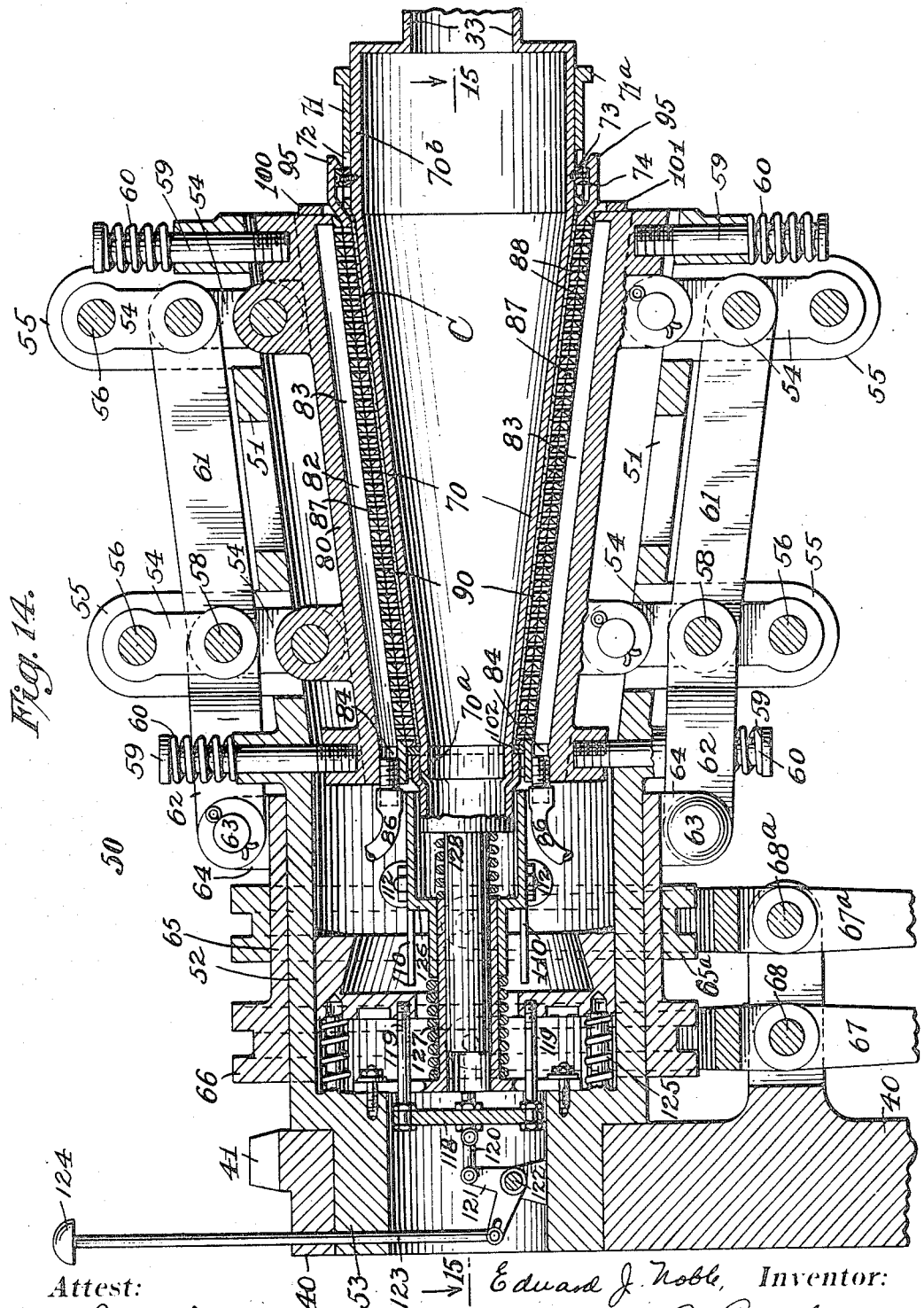

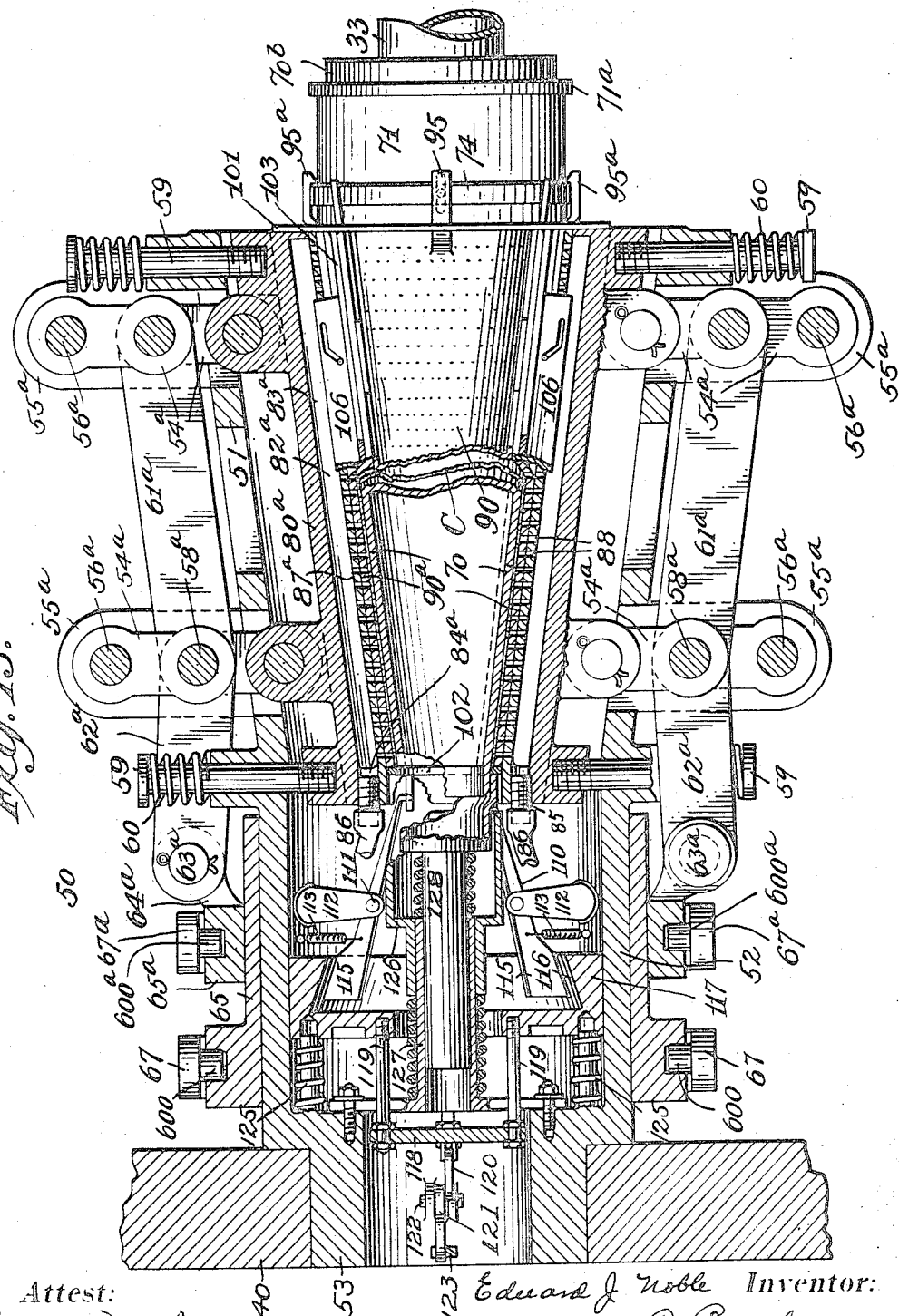

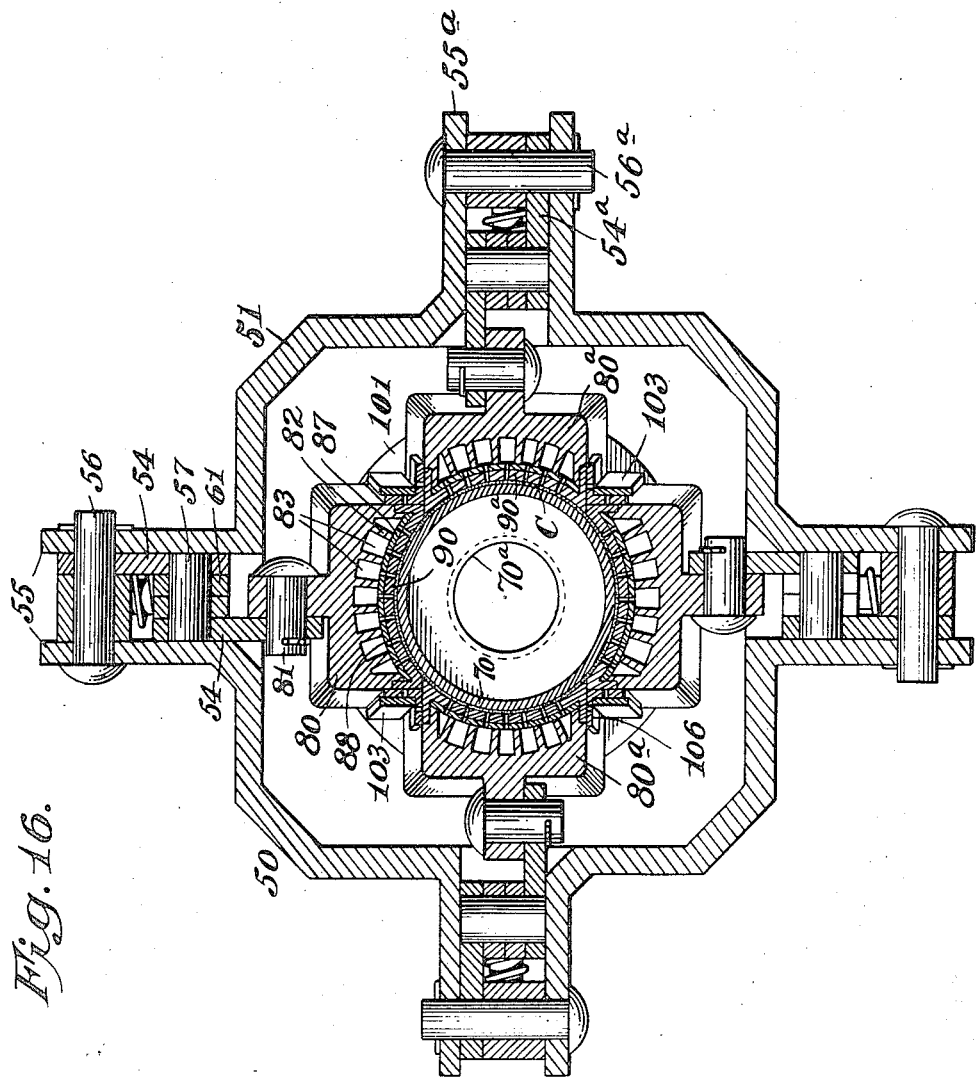

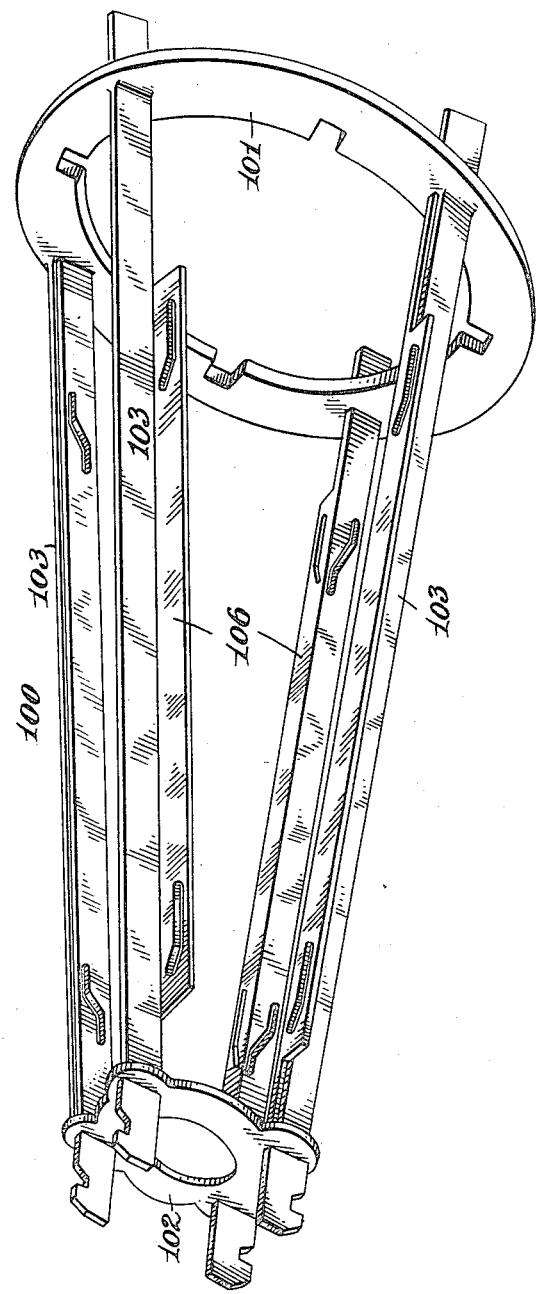

UNITED STATES PATENT OFFICE.

EDWARD J. NOBLE, OF NEW YORK, N. Y.

MOLDING OR SHAPING MACHINE.

1,146,812.  Specification of Letters Patent.  Patented July 20, 1915.

Application filed September 13, 1912. Serial No. 720,128.

*To all whom it may concern:*

Be it known that I, EDWARD J. NOBLE, a citizen of the United States, residing at New York city, in the county of New York and State of New York, have invented certain new and useful Improvements in Molding or Shaping Machines, of which the following is a specification.

This invention relates to shaping or molding machines in which to mold containers or similar articles from suitable plastic material.

The particular composition out of which the containers referred to are to be formed is not my invention but forms the subject matter of an application for Letters Patent of the United States of Charles S. Dolley, filed July 11, 1912, Serial No. 708,755. The ingredients consist briefly of kaolin or some other suitable inorganic silicate, wood pulp, casein, gelatin, a resinate soluble in water, as sodium resinate, and balata or some other gutta gum. All of these ingredients, except the gutta gum, are first brought by any suitable means to a proper degree of fineness and are combined while dry until thoroughly and uniformly mixed, when there is added to the mass a sufficient quantity of water to form an emulsion. The gutta gum, which has previously been dissolved in a suitable solvent, is then gradually added to the mass by spraying the same in solution upon the other ingredients while they are being mixed. There is thus formed a mass of the ingredients diffused in water which are treated in the molding machine which forms the subject matter of this application.

It will be understood that materials of similar nature may be similarly treated and that the invention does not reside merely in the application or use of the machine to the treatment of the particular composition mentioned. It can readily be applied by those skilled in the art to the treatment of similar materials having analogous characteristics.

The mixture of chosen ingredients diffused in water is led into a suitable chamber or receptacle, from which it is picked up and felted or transferred to an inner mold member adapted to be carried by a conveying system to the mechanism about to be described. In the treatment of the particular composition referred to, after the material has been transferred to such mold members, it is subjected to treatment by several processes or in several mechanisms, namely, it is subjected to a suitable mechanism to a process by which the excess water is expressed from the layer of material on the inner molds, and the felting or compacting of the material is then carried forward one step. It is then conveyed to a preheating chamber in which it is heated internally and externally so as to further assist in the formation of the finished article. It is conveyed to the molding machine which forms the subject of this application for a patent, in which it is made to assume its final shape and in which an outer mold is clamped upon the inner mold with the mixture of materials to be treated between them. The two molds are then carried away by the conveying system to a finishing chamber where they and their contents are subjected to the action of heat in order properly to finish or set the material of which the containers are made, and they are then automatically returned by the conveying system from this chamber to the molding machine, in which machine the outer molds are automatically removed; and finally, after the inner molds leave this machine, the finished containers which are still carried thereby are automatically ejected from the inner molds and the latter are adapted to receive a new burden of material to be treated.

In general, this molding machine comprises a bed-plate or platform upon which are mounted reciprocating carriages provided with holders arranged on opposite sides of the conveying system, and which holders are adapted to contain the outer mold members or shells. Means are provided for halting the inner mold members so that they are surrounded or enveloped by the holders when the latter reach the end of their inward stroke. It comprises means by which outer shells or mold members in sections are successively brought into contact with the material carried on the outer surface of the inner mold members and are clamped against such inner molds and retained thereon by means of suitable retaining bars so that the pressure exerted between the inner and outer molds is retained after the two molds leave the mechanism. Means are provided also for carrying away the inner and outer molds and bringing them back again to the machine where they are brought to rest and again enveloped by the same or similar holders, and at which time means are provided for removing the outer molds and allowing the inner molds with the finished containers to be carried away. Suitable means are provided for reciprocating the holder carriages at the proper time, moving the conveying system at the proper time, and moving the clamping mechanism to place the outer molds upon the inner molds and to remove them therefrom, together with other details of construction which will be described in detail.

Figure 7:
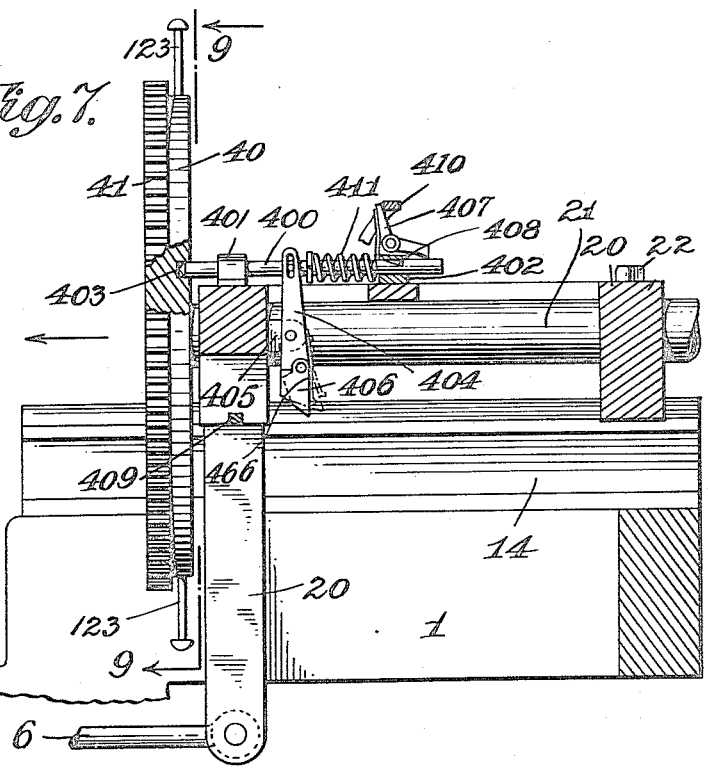
Figure 8:
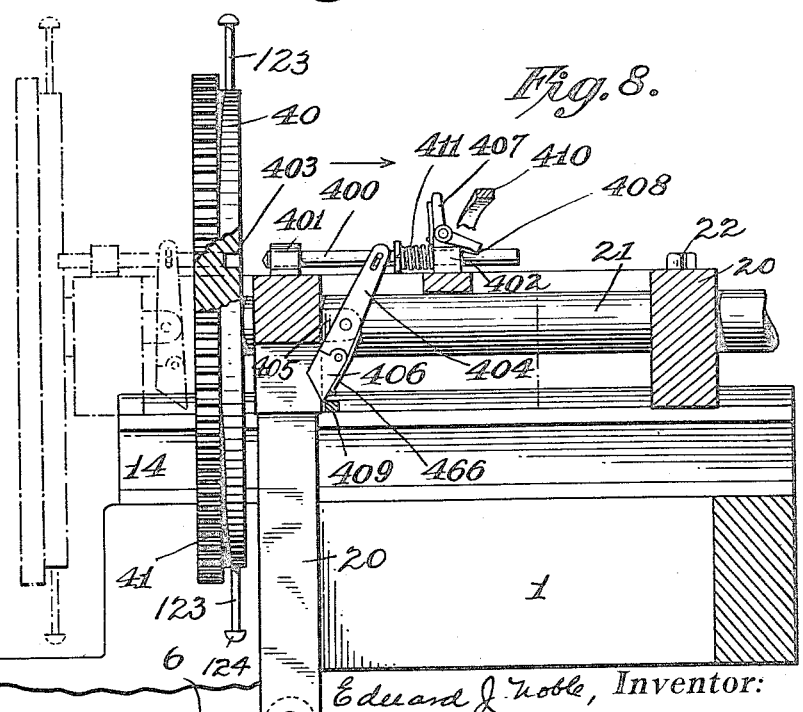

In the drawings, Figure 1 is a side elevation of an apparatus embodying the invention; Fig. 2 is a top plan view thereof showing the tracks of the conveyer in section; Fig. 3 is a vertical section on the plane of the broken line 3—3 in Fig. 2; Fig. 4 is a view similar to Fig. 3 but showing the holder carriages in their innermost position, at which they envelop or surround the inner molds; Fig. 5 is a vertical section of the machine on the plane of the line 5—5 in Fig. 2 but on larger scale; Fig. 6 is an end elevation of the machine shown on the same scale as the parts shown in Fig. 5; Figs. 7 and 8 are detail views of the over-rotation prevention device; Fig. 9 is a diminutive view of one side of the holder disk; Fig. 10 is a detail section of the clutch mechanism on the plane of the line 10—10 in Fig. 2; Fig. 11 is a perspective of the cam disk forming part of the clutch mechanism; Fig. 12 is a section of a portion of the clutch mechanism on the plane of the line 12—12 in Fig. 2; and Fig. 13 is a perspective view of the cam disk used in connection with the clutch. Figs. 14 and 15 are enlarged sectional views of the inner and outer molds and connected parts. Fig. 16 is a section taken on the line 16—16 of Fig. 14, and Fig. 17 is a perspective view of the outer mold cage in which are supported the parts of the outer mold.

In the drawings, 1 is the bed-plate of the machine supported in any suitable manner as on legs 2.

3 is a gear wheel mounted on a crank shaft 4 suitably mounted to revolve in bearings in the bed-plate 1 and having diametrically opposed cranks 5 to which are pivoted connecting rods 6, the other ends of which in turn are pivoted to carriages 20 adapted to be reciprocated above the bed-plate. The gear wheel 3 meshes with a pinion 7 mounted on a stub shaft 8 adapted to revolve in bearings in the bed-plate 1, and is connected to a spiral gear 9 mounted on this same shaft 8 which meshes with a worm gear 10 mounted on a main driving shaft 11 suitably secured in bearings 12 and having a pulley 13 mounted thereon at a suitable place.

Each reciprocating carriage 20 comprises a rectangular sub-frame adapted to reciprocate in slideways 14 supported upon and secured to the bed-plate 1. Each carriage is adapted to receive a hollow cylindrical shaft 21 secured against rotation by set screws 22 and having rotatably mounted on its inner end a disk 40 on which are mounted a pair of hollow conical outer mold holders 50 diametrically placed on the disk. Slidably mounted within the hollow shaft 21 is a second hollow shaft 24 within which is yet a third shaft 23. The inner ends of the shafts 24 and 23 are respectively pivoted to forked levers 67 and 67ª pivoted on the disk 40. The outer ends of the shafts 23 and 24 are turned to form hooks 23ª and 24ª which are adapted, when the carriage 20 is reciprocated, to engage cams 15 and 15ª which are secured to a transverse shaft 16 suitably mounted in bracket bearings 17 and which cams are connected to the driving shaft by bevel gears 18 and 19. Each of these cams has a high point.

At the center of the machine there is arranged a double track 32, only part of which is shown. This track is adapted to support a number of arbors or short shafts 33, on each end of which are mounted inner molds 70 which are conveyed along the tracks 32 by means of a suitable conveyer hereinafter described.

Means are provided for rotating the disk 40 intermittently. These comprise a gear 25 which is mounted on the shaft 11 and which gear meshes with a similar gear 26 secured to a counter-shaft 27 directly back of the shaft 11 (see Fig. 2), and on the end of which counter-shaft is secured a cam disk 28. The periphery of the disk 40 is provided with teeth 41 which mesh with a pinion 30 slidably mounted on a shaft 29, on the outer end of which is mounted to rotate idly one member 310 of a clutch, the other member 320 of which is slidably secured to the shaft 29. The member 310 is constantly rotated by means of a belt 321 actuated from a pulley 323 secured to the shaft 11. A spring 34 tends constantly to force the member 320 of the clutch into engagement with the member 310, both of these members being provided with slanting teeth adapted to engage in one direction only. The member 320 is provided with a feathering disk 35, the inner end of which is in contact with the outer edge of the cam disk 28. This cam disk is provided with a recess 280 in its periphery so that when this recess reaches the feathering disk 35 in the course of its rotation, the clutch member 320 is forced into engagement with the clutch member 310 through the action of the spring 34, and through the train of mechanisms described the disk 40 is rotated a half turn.

It will be evident that when the crank shaft 4 is rotated, each carriage 20 with its disk 40 carrying its holder 50 will reciprocate in the ways 14, on each side of the machine. As the hollow conical holders move forward to the center of the machine, the end of the stroke will bring them in such a position that they surround the molds on the track 32. The two upper holders will surround the inner and outer molds which have been through the finishing chamber, and the two lower holders will surround the inner molds upon which has been deposited the material to be molded and treated. It is evident that as the disks 40 are reciprocated, the pinion 30 must be kept in engagement with the teeth 41 on the edges of these disks. Consequently, guard plates 31 are placed on both sides of each pinion 30 and are adapted to overlap the teeth 41 and thus prevent the disengagement of the pinion teeth from those of the disk and cause the pinions 30 to slide along the shafts 29 on which they are mounted.

Each outer mold comprises four perforated shells 90, 90 and 90$^a$, 90$^a$, which taken together form a complete frustum of a cone. The lower holders contain the shells which are to be clamped over the fresh material on the inner molds, while the upper holders are provided with means to remove the shells of the outer molds from the finished containers. After the holders have remained in their innermost position long enough to admit of the performance of the functions of clamping the outer molds of one pair of inner molds, and simultaneously removing the outer molds from the other pair of inner molds, they are moved back by the reciprocation of the disks 40 which has been above described, and these disks with the holders 50 attached thereon are then caused to revolve a half turn as has been above described. This movement brings the holder which was formerly uppermost into its diametrically opposite lowermost position and in line with the new inner mold which has been brought into the proper engaging position by the conveying system.

The inner and outer molds employed in connection with this mechanism and their immediately connected parts form the subject matter of another application for Letters Patent of the United States filed by me on the 31st day of August 1912, Serial No. 718,002, but an understanding of the general construction and mode of operation of the molds is necessary to an understanding of the mechanism which is the subject matter of this application, and therefore these molds and their connected parts will now be described.

In Figs. 14 and 15 there are shown enlarged sectional views of the inner and outer molds. Each holder 50 comprises a casing 51 which is substantially octagonal in section at its inner end and which tapers toward the opposite end where it merges into a cylinder 52 and, as it continues, merges into a yet smaller cylinder 53 which is secured to the disk 40. Suspended within the casing 51 are two vertical clamp plates 80 and two horizontal clamp plates 80$^a$. They are each provided with pivots which oscillate in lugs on the clamp plates and are suspended from the casing by pairs of toggle levers 54 and 54$^a$, each provided with a pivot 56 oscillating in a lug 55 on the outside of the casing. Each set of toggles is connected by a cross bar 61 secured to them by pivots. The clamp plates are further supported by guide pins 59 which project through the casing and screw into them. Compression springs are placed between the head of each pin 59 and the casing 51 and tend to draw the clamps away from the center of the inner mold.

The vertical clamp plates are moved to and fro with respect to the molds which they surround by means of the toggle levers 54 through a bar 62 which is secured at one end to the pivot 58 and at the other end to a pin 63 which is mounted in lugs 64 made integral with a cylindrical collar 65 which is slidably mounted on the reduced portion 52 of the casing. The collar referred to is provided with an annular flange 66 having a groove adapted to receive a pin 600 on the end of the forked lever 67 which is pivoted at 68 to the disk 40. The other end of this lever 67 is pivoted to the hollow rod 24 which terminates in the hook 24$^a$ which is adapted to be engaged by the cam 15$^a$. It is evident that as the cam 15$^a$ revolves, when the hook 24$^a$ of the rod 24 engages its highest point, the rod will be drawn out and moved with respect to the carriage 20. This in turn will move the lever 67 and through it the collar 65 and straighten out the toggles 54 against the tension of the springs 60. The horizontal clamp plates 80$^a$ are similarly moved by a bar 62$^a$ which is connected by similar mechanism, including a grooved ring 65$^a$ slidably mounted on the collar 65, and a pin 600$^a$ on the end of the forked lever 67$^a$, and which lever is pivoted to the rod 23. The cam 15 is timed to engage the hook 23$^a$ on the rod 23 and move the vertical clamp plates slightly ahead of the horizontal ones. Through these toggle levers and connections reaching back to the hooks 23$^a$ and 24$^a$ and the cams 15 and 15$^a$, the clamp plates are moved against the members in the outer mold.

The inner mold 70 consists of a hollow cone having a cylindrical portion 70$^a$ at its smaller end and a similar portion 70$^b$ at its larger end. The portion 70$^b$ is reduced to form the arbor 33 which may be integral therewith or suitably secured thereto, and which is adapted to be attached to a similar inner mold at its opposite end. Over the cylindrical portion 70$^b$ there is arranged a stripping sleeve 71 having an annular flange 71$^a$ adapted to be engaged by a stripping device (not shown) which is adapted to push the sleeve outwardly, bringing its outer edge against the end of the formed container C held on the outer surface of the inner mold, thus giving it a push at the proper time, whereby it may be easily disengaged from the inner mold. The sleeve 71 is also provided with a series of slots 72 in which are inserted blocks 73 to which are secured a ring 74 adapted to be engaged by hooks 95 on the end of each of the vertical shells 90 and hooks 95$^a$ on the end of each of the horizontal shells 90$^a$.

The construction of the vertical and horizontal clamp plates is the same. Each clamp plate is substantially rectangular in cross section, their inner surfaces conforming to that of the shells of the outer mold. They are provided with radial partitions 82 to form air passages 83 which terminate in a common air chamber 84 and which has an outlet conduit 85 adapted to be connected to a flexible pipe 86 leading to an air-exhausting means such as a pump (not shown). A curved plate 87 is attached to the inner surface of each clamp and is provided with apertures 88 which register with the air passages 83.

The outer mold is made up of two vertical and two horizontal shells 90 and 90$^a$ respectively which are supported in a cage 100. This cage is made up of plates or disks 101 and 102 connected by longitudinal bars 103. The plate 101 is recessed to allow the hooks 95 and 95$^a$ on the end of the shells to project therethrough. It is also slotted to allow the pressure retaining bars 106 to project through and move freely therein between the two disks. The plate 102 is provided with a circular opening so that it will slip over the cylindrical portion 70$^a$ of the inner mold, and it is also provided with suitable slots to allow the ends of the pressure retaining bars 106 to project through and move freely therein. These shells are so shaped that each forms practically a quadrant of the frustum of a cone. Each shell is also provided with outwardly projecting longitudinal flanges, one on each side, and each flange is provided with stout outwardly projecting pins adapted to engage cam slots in the pressure retaining bars. These pressure retaining bars each comprise a long bar, the ends of which are adapted to slide in the slots provided for that purpose in the cage surrounding the molds. This long bar for a portion of its length is provided with a flange plate which is substantially at right angles thereto, and the flanges are parallel to the flanges on the shells to which they are adjacent when the parts are assembled. The long bar has cam slots, one at each end, and identical in shape and which are adapted to be engaged by the pins on the shell flanges. The cam slots in the bars which are adjacent to the vertical shells differ in shape from those on the bars which are adjacent to the bars on the horizontal shells, and the slots are so arranged that when the bars are engaged by the pins on the flanges of the shells, the pins on the vertical shells cause the latter to be moved to contact with the layer of material on the inner mold 70 before the pins on the horizontal shells cause the latter to be so moved to such contact, and the result is that the vertical shells are caused to press against the material on the mold before the horizontal shells.

The pressure retaining bars 106 are moved with respect to the cage 100 and the molds which they surround by means of a hollow spring-pressed plunger 126 supported on a hollow bearing rod 127 secured to the rear wall of the casing 51. It is adapted to press against the ends of the pressure retaining bars. Within this plunger 126 is a second hollow spring-pressed plunger 128 supported within the hollow bearing rod 127. This is adapted to abut against the plate 102 of the cage 100 serving to put a tension on the cage to press it outwardly.

Means are provided for disengaging the outer from the inner molds. Hooks 110 are pivoted at 111 to brackets 112 within the reduced part of the casing 51. They are provided with springs 113 which tend to move them into engagement with notches provided for that purpose in the ends of the pressure retaining bars. The ends of the hooks are chamfered off and adapted to snap into these notches. As it is necessary to release the holding hooks from these notches when the shells are to remain on the outer mold, means are provided for rocking the hooks on their pivots by causing their enlarged ends 115 to engage a cam surface 116 formed on a block 117 slidably mounted within the annular portion 52 of the casing 51. This block is connected to a cross-head 118 by rods 119 and the cross-head is connected in turn by a rod 120 to one arm of the bell crank lever 121 pivoted at 122 to lugs on the inside of the reduced portion 53 of the casing 51. The other arm of the bell crank lever 121 is pivoted to a vertical rod 123 which projects through the edge of the disk 40 and terminates in a knob 124 adapted to engage a cam 224 on the frame of the machine. Springs 125 serve to restore the cam block 117 to its normal position.

The reciprocations of the carriages on which the holder disk 40 is mounted has been referred to. It is obvious that such reciprocation must be so timed that the carriages are brought to rest at the end of their inward stroke for such length of time that an opportunity is afforded for the outer molds to be placed on the inner molds by one pair of holders, and for the outer molds to be removed from the inner molds by the other pair of holders; and it is further obvious that at the end of the outer stroke the carriages must be brought to rest a sufficient length of time to allow each carriage to be rotated one-half turn so as to bring the uppermost pair of holders to the lowermost position, and vice versa. The means by which this reciprocation and intermittency of movement is secured is as follows: The gear wheel 3 is loosely mounted to rotate on the crank shaft 4. On each side of it, and fixed on the shaft, are collars which serve to fix its position. On one side, its hub is extended to form one member 551 of a clutch, the periphery of which member is provided with sloping teeth 552. Alongside of the gear 3 is a disk 553 having a beveled edge 554 and which disk is mounted on the shaft 4 and rotates and is adapted to slide longitudinally therein, being secured by a key. Its hub is extended to form the second member 557 of the clutch above referred to, and its periphery is provided with sloping teeth 558 adapted to engage the teeth 552. A compression spring 559 tends to press the disk 553 toward the gear 3 and to promote the engagement of the clutch members. A gear 560 mounted on the shaft 561 adapted to rotate in bearings in the frame of the machine is in constant mesh with the gear 3. Also mounted on the same shaft 561 is a cam disk 562 having two inwardly projecting cam surfaces 563. This disk is so placed that these cams overlap the edge of the disk 553 so that as it rotates, twice in each revolution when the cam surfaces 563 contact with the disk 553, the latter is moved against the tension of the spring 559 and its clutch member is moved out of engagement with the clutch member on the gear 3, and while so out of engagement the power of the main shaft 11 is not transmitted to the crank shaft 4, and the carriages are at rest, and this period of rest occurs at each end of the stroke due to the diametrically opposite positions of the cam surfaces 563.

The mechanism for rotating the disk 40 one-half turn has already been described. The same clutch mechanism is employed for controlling the movement of the conveying system by which the molds are carried to and from the machine. To that end, the shaft 29 is extended to the left and beyond the guard plates 31 of the pinion 30. Mounted on this shaft is a pinion 305 which meshes with a gear 306 which in turn is mounted on a shaft 307 adapted to revolve in bearings formed in the central track. The shaft 307 carries a pinion 308 which meshes with a gear 309 which in turn is mounted on a shaft 310. This gear 309 is mounted between the tracks and between the flexible members of the conveyer. It is adapted to mesh with two gears 311 and 312 which are mounted on shafts 313 and 314 respectively. On the shaft 313 is secured a sprocket wheel which serves to actuate a horizontal conveyer A of the conveying system, while on the shaft 314 is mounted a sprocket wheel which serves to actuate a vertical conveyer B of the conveying system. When the clutch members in line with the shaft 29 are thrown into engagement, the conveyers A and B are moved; when they are thrown out of engagement, they are at rest. Consequently, by means of the described mechanism, the conveyers of the conveying system are given an intermittent movement. In order to secure a proper synchronism of movement of the disks 40 on opposite sides of the conveying system, a pinion 315 is mounted on the shaft 307. This is adapted to mesh with a gear 316 mounted on a shaft 300, to which is slidably secured a pinion 301 which engages the teeth on the rim of the left hand disk 40, so that the pinion 301 and the pinion 30 move in the same direction at the same rate of speed, being connected through the described trains of mechanism.

Means are provided for accurately positioning the disk 40 at each one of its semicircular movements. To that end, there is provided in connection with each carriage 20 a spring-pressed bolt 400 mounted in suitable guide members 401 and 402 formed integral with or partially secured to said carriage and which bolt is adapted to engage diametrically disposed recesses 403 on the rear side of the disk 40 (see Fig. 9). A cocking lever 404 is mounted to oscillate on a lug 405 which is secured to or made integral with the carriage 20. Near one extremity this lever is slotted and is adapted to engage a pin provided for that purpose which projects outwardly from the bolt 400. At its opposite extremity this lever is provided with a movable member 406 held in position by a spring 466 and which member is adapted to engage a tripping lug 409 secured to or made integral with the bed-plate 1 of the machine. This spring-pressed member 406 is so constructed and arranged that when the carriage moves toward the right as shown in Figs. 7 and 8, and therefore away from the molds on the conveyer, the member 406 will engage the lug 409 and move the bolt 400 so that it is moved out of engagement with the recess 403 in the disk 40, thus unlocking this disk and permitting it to be rotated. When the carriage is reciprocated in the opposite direction, the member 406 wipes over or contacts with the lug 409 without affecting the position of the lever 404 and without, of course, moving the bolt 400.

Means are provided to positively lock the bolt 400 into engagement with the disk 40 and thereby prevent accidental movement or over-rotation of this disk as follows: A spring-pressed bell crank lever 407 is pivoted at a suitable place on the carriage 20 and preferably on the guide member 402. Its lower leg is adapted to engage a notch 408 formed in the bolt 400. 410 is an arm secured to the bed-plate 1 of the machine or made integral therewith and having a fixed position. It is adapted to engage the bell crank lever 407 at the end of the reciprocation of the carriage, and thereby to unlock or move back the bolt 400 from its engagement with the recess 403 and the disk 40, but it allows the bolt 400 to be pressed by a spring 411 against the face of the disk 40 so as to be in readiness, when the disk has been rotated half a turn, to immediately engage the appropriate recess 403 provided to receive it. This engagement being positive and the parts being proportioned and of proper size and strength, no over-rotation of the disk is possible.

It is thought that the operation of the machine will be readily comprehended and understood from the foregoing description, but to summarize the functions of the several parts, its operation may be stated to be as follows: Assuming that the conveyer system has brought to rest a pair of inner mold holders in line with the pair of outer mold holders at the top of the machine, and has similarly brought to rest a pair of inner mold holders in line with the outer mold holders at the bottom of the machine, and that the carriages 20 have moved toward each other so as to bring the two disks 40 at the end of their stroke,—it is obvious from the foregoing description that the shells of the outer molds with their surrounding cages will be pressed toward and upon the material on the surfaces of the two upper inner molds, and that the mechanism for unlocking the outer molds from the inner molds will be brought into operation by such reciprocation of the lower pair of outer mold holders. After a sufficient length of time has elapsed to permit of the performance of these functions, the carriages 20 will be reciprocated away from each other and the conveying system will be operated to move the pair of inner molds which were engaged with the lowermost pair of outer mold holders toward that portion of the machine where the finished containers are ejected from the inner molds, and to move the pair of inner molds on which the outer molds have been clamped toward the finishing chamber.

What I claim is:—

1. The combination with a system of outer molds and holders, one for each mold, of a conveying system adapted to carry a succession of inner molds intermittently in one direction past the holder system, means for transferring to each inner mold, when it is stopped by the conveying system opposite a holder, an outer mold from such holder, and means for holding the molds together after such transfer whereby the two molds maintaining under pressure whatever is between them are carried away together by the conveying system.

2. The combination with a system of outer molds and holders, one for each mold, of a conveying system adapted to carry a succession of inner molds intermittently in one direction past the holder system, means for transferring to each inner mold, when it is stopped by the conveying system opposite a holder, an outer mold from such holder, and means for holding the molds together after such transfer whereby the two molds maintaining under pressure whatever is between them are carried away together by the conveying system, all of the inner and outer molds being imperforate.

3. A shaping machine adapted to form by pressure between two molds, a container of substantially the form of the space between the molds, comprising a conveyer, adapted to support and carry molds arranged in pairs and projecting laterally from the conveyer, one on each side thereof, means for moving the conveyer intermittently, a system of holders adapted to support and carry in pairs, one of each pair on opposite sides of the conveyer, molds adapted to coöperate with the molds carried by the conveyer, means for bringing together on the same side of the conveyer one mold from the conveyer and one mold from the holder, and moving them away together from the place where they were brought together.

4. A shaping machine adapted to form by pressure between two molds, a container of substantially the form of the space between the molds, comprising a conveyer, adapted to support and carry molds arranged in pairs and projecting laterally from the conveyer, one on each side thereof, means for moving the conveyer intermittently, a system of holders adapted to support and carry in pairs molds adapted to coöperate with the molds of the conveyer, and means for transferring in succession the molds from the holders to the molds on the conveyer and after such transfer moving the combined molds away from the place of such transfer.

5. A shaping machine adapted to form by pressure between two molds, a container of substantially the form of the space between the molds, comprising a conveyer, adapted to support and carry molds arranged in pairs and projecting laterally from the conveyer, one on each side thereof, means for moving the conveyer intermittently, a system of holders adapted to support and carry in pairs molds adapted to coöperate with the molds of the conveyer, means for reciprocating the holder system whereby a holder containing a mold is brought to rest opposite each mold of the conveyer system, and means for transferring the holder mold to the conveyer mold while the conveyer and holder systems are at rest.

6. A shaping machine adapted to form by pressure between two molds, a container of substantially the form of the space between the molds, comprising a conveyer, adapted to support and carry molds arranged in pairs and projecting laterally from the conveyer, one on each side thereof, means for moving the conveyer intermittently, a system of holders adapted to support and carry in pairs molds adapted to coöperate with the molds of the conveyer, means for reciprocating the holder system whereby a holder containing a mold is brought to rest opposite each mold of the conveyer system, means for transferring the holder mold to the conveyer mold while the conveyer and holder systems are at rest, and means for moving away the combined molds.

7. A shaping machine adapted to form by pressure between two molds, a container of substantially the form of the space between the molds, comprising a conveyer adapted to support and carry molds arranged in pairs and projecting laterally from the conveyer one on each side thereof, means for moving the conveyer intermittently, a system of holders adapted to support and carry in pairs, corresponding to the pairs of molds of the conveyer system, molds adapted to coöperate with the corresponding molds of the conveyer system, and means for moving the holder system to and fro with respect to the conveyer system and keeping a pair of them containing molds at rest opposite the conveying system while the latter is at rest and while at rest transferring molds from the holders to those on the conveyers.

8. A shaping machine adapted to form by pressure between two molds, a container of substantially the form of the space between the molds, comprising a conveyer, adapted to support and carry molds arranged in pairs and projecting laterally from the conveyer one on each side thereof, means for moving the conveyer intermittently, a system of holders adapted to support and carry in pairs, one on each side of the conveyer molds adapted to coöperate with the molds of the conveyer, and means for securing together a mold from the holder and a mold from the conveyer.

9. A shaping machine adapted to form by pressure between two molds, a container of substantially the form of the space between the molds, comprising a conveyer, adapted to support and carry molds arranged in pairs and projecting laterally from the conveyer one on each side thereof, means for moving the conveyer intermittently, a system of holders adapted to support and carry in pairs, one on each side of the conveyer molds adapted to coöperate with the molds of the conveyer, and means for reciprocating the holders with respect to the conveyer and means for securing together a mold from the holder and a mold from the conveyer while the holders and conveyers are at rest.

10. A shaping machine adapted to form by pressure between two molds, a container of substantially the form of the space between the molds, comprising a conveyer, adapted to support and carry molds arranged in pairs and projecting laterally from the conveyer one on each side thereof, means for moving the conveyer intermittently, a system of holders adapted to support and carry in pairs, one on each side of the conveyer molds adapted to coöperate with the molds of the conveyer, and means for reciprocating the holders with respect to the conveyer and means for securing together a mold from the holder and a mold from the conveyer while the holders and conveyers are at rest, and causing the combined molds to be moved away from their place of union.

11. A shaping machine adapted to form by pressure between two molds, a container of substantially the form of the space between the molds, comprising a conveyer, adapted to support and carry molds arranged in pairs and projecting laterally from the conveyer one on each side thereof, means for moving the conveyer intermittently, a system of holders adapted to support and carry in pairs, one on each side of the conveyer molds adapted to coöperate with the molds of the conveyer, and means for reciprocating the holders with respect to the conveyer and means for securing together a mold from the holder and a mold from the conveyer while the holders and conveyers are at rest, and causing the combined molds to be moved away from their place of union as soon as the conveyers and holders are moved.

12. A shaping machine adapted to form by pressure between two molds, a container of substantially the form of the space between the molds, comprising a conveyer, adapted to support and carry molds arranged in pairs and projecting laterally from the conveyer one on each side thereof, means for moving the conveyer intermittently, a system of holders adapted to support and carry in pairs, one on each side of the conveyer molds adapted to coöperate with the molds of the conveyer, and means for reciprocating the holders with respect to the conveyer whereby a pair of holders containing molds are brought opposite a pair of molds on the conveyer while the latter is at rest, and means for transferring the holder molds to the conveyer molds while the parts are at rest.

13. A shaping machine adapted to form by pressure between two molds, a container of substantially the form of the space between the molds, comprising a conveyer, adapted to support and carry molds arranged in pairs and projecting laterally from the conveyer one on each side thereof, means for moving the conveyer intermittently, a system of holders adapted to support and carry in pairs, one on each side of the conveyer molds adapted to coöperate with the molds of the conveyer, and means for reciprocating the holders with respect to the conveyer whereby a pair of holders containing molds are brought opposite a pair of molds on the conveyer while the latter is at rest, and means for transferring the holder molds to the conveyer molds while the parts are at rest and locking them together.

14. A shaping machine adapted to form by pressure between two molds, a container of substantially the form of the space between the molds, comprising a conveyer, adapted to support and carry molds arranged in pairs and projecting laterally from the conveyer one on each side thereof, means for moving the conveyer intermittently, a system of holders adapted to support and carry in pairs, one on each side of the conveyer molds adapted to coöperate with the molds of the conveyer, and means for reciprocating the holders with respect to the conveyer whereby a pair of holders containing molds are brought opposite a pair of molds on the conveyer while the latter is at rest, and means for transferring the holder molds to the conveyer molds while the parts are at rest and locking them together, whereby when the conveyer is moved they will be carried away by it together.

15. A shaping machine adapted to form by pressure between two molds, a container of substantially the form of the space between the molds, comprising a conveyer, adapted to support and carry molds arranged in pairs and projecting laterally from the conveyer one on each side thereof, means for moving the conveyer intermittently, a system of holders adapted to support and carry in pairs, one on each side of the conveyer molds adapted to coöperate with the molds of the conveyer, and means for reciprocating the holders with respect to the conveyer whereby a pair of holders containing molds are brought opposite a pair of molds on the conveyer while the latter is at rest, and means for transferring the holder molds to the conveyer molds while the parts are at rest and without removing the molds from the conveyer.

16. A shaping machine adapted to form by pressure between two molds, a container of substantially the form of the space between the molds, comprising a conveyer, adapted to support and carry molds arranged in pairs and projecting laterally from the conveyer one on each side thereof, means for moving the conveyer intermittently, a system of holders adapted to support and carry in pairs, one on each side of the conveyer molds adapted to coöperate with the molds of the conveyer, and means for reciprocating the holders with respect to the conveyer whereby a pair of holders containing molds are brought opposite a pair of molds on the conveyer while the latter is at rest, and means for transferring the holder molds to the conveyer molds while the parts are at rest and without removing the molds from the conveyer, whereby when the conveyer is moved they will be carried away by it together.

17. A shaping machine adapted to form by pressure between two molds, a container of substantially the form of the space between the molds, comprising a conveyer, adapted to support and carry molds arranged in pairs and projecting laterally from the conveyer one on each side thereof, means for moving the conveyer intermittently, a system of holders adapted to support and carry in pairs, one on each side of the conveyer molds adapted to coöperate with the molds of the conveyer, and means for reciprocating the holders with respect to the conveyer whereby a pair of holders containing molds are brought opposite a pair of molds on the conveyer while the latter is at rest, and means for transferring the holder molds to the conveyer molds while the parts are at rest and locking them together and without removing the molds from the conveyer.

18. A shaping machine adapted to form by pressure between two molds, a container of substantially the form of the space between the molds, comprising a conveyer adapted to support and carry molds arranged in pairs and projecting laterally from the conveyer one on each side thereof, means for moving the conveyer intermittently, a system of holders adapted to support and carry in pairs, one on each side of the conveyer, molds adapted to coöperate with the molds of the conveyer, and means for reciprocating the holders with respect to the conveyer whereby a pair of holders containing molds are brought opposite a pair of molds on the conveyer while the latter is at rest, and means for transferring the holder molds to the conveyer molds while the parts are at rest and locking them together and without removing the molds from the conveyer whereby when the conveyer is moved they will be carried away by it together securely locked.

19. A shaping machine adapted to form by pressure between two molds, a container of substantially the form of the space between the molds, comprising a conveyer adapted to support and carry molds arranged in pairs and projecting laterally from the conveyer one on each side thereof, means for moving the conveyer intermittently, a system of holders adapted to support and carry in pairs, one on each side of the conveyer, molds adapted to coöperate with the molds of the conveyer, and means for reciprocating the holders with respect to the conveyer whereby a pair of holders containing molds are brought opposite a pair of molds on the conveyer while the latter is at rest, and means for transferring the holder molds under pressure to the conveyer molds.

20. A shaping machine adapted to form by pressure between two molds, a container of substantially the form of the space between the molds, comprising a conveyer adapted to support and carry molds arranged in pairs and projecting laterally from the conveyer one on each side thereof, means for moving the conveyer intermittently, a system of holders adapted to support and carry in pairs, one on each side of the conveyer, molds adapted to coöperate with the molds of the conveyer, and means for reciprocating the holders with respect to the conveyer whereby a pair of holders containing molds are brought opposite a pair of molds on the conveyer while the latter is at rest, and means for transferring the holder molds under pressure to the conveyer molds without removing the latter from the conveyer.

21. A shaping machine adapted to form by pressure between two molds, a container of substantially the form of the space between the molds, comprising a conveyer adapted to support and carry molds arranged in pairs and projecting laterally from the conveyer one on each side thereof, means for moving the conveyer intermittently, a system of holders adapted to support and carry in pairs, one on each side of the conveyer, molds adapted to coöperate with the molds of the conveyer, and means for reciprocating the holders with respect to the conveyer whereby a pair of holders containing molds are brought opposite a pair of molds on the conveyer while the latter is at rest, and means for transferring the holder molds under pressure to the conveyer molds without removing the latter from the conveyer and while the holder is at rest.

22. A shaping machine adapted to form by pressure between two molds, a container of substantially the form of the space between the molds, comprising a conveyer adapted to support and carry molds arranged in pairs and projecting laterally from the conveyer one on each side thereof, means for moving the conveyer intermittently, a system of holders adapted to support and carry in pairs, one on each side of the conveyer, molds adapted to coöperate with the molds of the conveyer, and means for reciprocating the holders with respect to the conveyer whereby a pair of holders containing molds are brought opposite a pair of molds on the conveyer while the latter is at rest, and means for transferring the holder molds under pressure to the conveyer molds and moving away the holders while the conveyer is at rest.

23. A shaping machine adapted to form by pressure between two molds, a container of substantially the form of the space between the molds, comprising a conveyer adapted to support and carry molds arranged in pairs and projecting laterally from the conveyer one on each side thereof, means for moving the conveyer intermittently, a system of holders adapted to support and carry in pairs, one on each side of the conveyer, molds adapted to coöperate with the molds of the conveyer, and means for reciprocating the holders with respect to the conveyer whereby a pair of holders containing molds are brought opposite a pair of molds on the conveyer while the latter is at rest, and means for transferring the holder molds under pressure to the conveyer molds without removing the latter from the conveyer and moving away the holders while the conveyer is at rest.

24. A shaping machine adapted to form by pressure between two molds, a container of substantially the form of the space between the molds, comprising a conveyer adapted to support and carry molds arranged in pairs and projecting laterally from the conveyer one on each side thereof, means for moving the conveyer intermittently, a system of holders adapted to support and carry in pairs, one on each side of the conveyer, molds adapted to coöperate with the molds of the conveyer, and means for reciprocating the holders with respect to the conveyer whereby a pair of holders containing molds are brought opposite a pair of molds on the conveyer while the latter is at rest, and means for transferring the holder molds under pressure to the conveyer molds without removing the latter from the conveyer and moving away the holders while the conveyer is at rest so as to permit the combined molds to be moved away by the conveyer system.

25. A shaping machine adapted to form by pressure between two molds, a container of substantially the form of the space between the molds, comprising a conveyer adapted to support and carry molds arranged in pairs and projecting laterally from the conveyer one on each side thereof, means for moving the conveyer intermittently, a system of holders adapted to support and carry in pairs, one on each side of the conveyer, molds adapted to coöperate with the molds of the conveyer, and means for reciprocating the holders with respect to the conveyer whereby a pair of holders containing molds are brought opposite a pair of molds on the conveyer while the latter is at rest, and means for transferring the holder molds under pressure to the conveyer molds without removing the latter from the conveyer, and maintaining such pressure while both molds are carried by the conveyer.

26. A shaping machine adapted to form by pressure between two molds, a container of substantially the form of the space between the molds, comprising a conveyer adapted to support and carry molds arranged in pairs and projecting laterally from the conveyer one on each side thereof, means for moving the conveyer intermittently, a system of holders adapted to support and carry in pairs, one on each side of the conveyer, molds adapted to coöperate with the molds of the conveyer, and means for reciprocating the holders with respect to the conveyer whereby a pair of holders containing molds are brought opposite a pair of molds on the conveyer while the latter is at rest, and means for transferring the holder molds under pressure to the conveyer molds and moving away the holders while the conveyer is at rest and maintaining such pressure after the conveyer has moved the combined molds away from the holder.

27. A shaping machine adapted to form by pressure between two molds, a container of substantially the form of the space between the molds, comprising a conveyer adapted to support and carry molds arranged in pairs and projecting laterally from the conveyer one on each side thereof, means for moving the conveyer intermittently, a system of holders adapted to support and carry in pairs, one on each side of the conveyer, molds adapted to coöperate with the molds of the conveyer, and means for reciprocating the holders with respect to the conveyer whereby a pair of holders containing molds are brought opposite a pair of molds on the conveyer while the latter is at rest, and means for transferring the holder molds under pressure to the conveyer molds and moving away the holders while the conveyer is at rest and maintaining such pressure after the conveyer has moved the combined molds away from the holder and while the combined molds are on the conveyer.

28. The combination with a holder for an outer mold, of an inner mold, means for moving the outer mold to and surrounding the inner mold and clamping it against the latter under pressure, and means for releasing the outer mold so clamped from its holder.

29. The combination with a holder for an outer mold, of an inner mold, means for moving the outer mold to and surrounding the inner mold and clamping it against the latter under pressure, and means for releasing the outer mold so clamped from its holder and maintaining the pressure on the inner mold.

30. The combination with a holder for an outer mold, of an inner mold, means for moving the outer mold to and surrounding the inner mold and clamping it against the latter under pressure, and means for releasing the outer mold so clamped from its holder and maintaining the pressure on the inner mold and relieving said pressure.

31. The combination with a holder for an outer mold, of an inner mold, means for moving the outer mold to and surrounding the inner mold and clamping it against the latter under pressure, and means for releasing the outer mold so clamped from its holder and maintaining the pressure on the inner mold and relieving said pressure and retransferring the outer mold to a holder.

32. The combination with a holder for an outer mold, of an inner mold, means for moving the outer mold to and surrounding the inner mold and clamping it against the latter under pressure, and means for releasing the outer mold so clamped from its holder and maintaining the pressure on the inner mold and relieving said pressure and retransferring the outer mold to a holder, all of said operations being performed in succession.

33. The combination with a holder for an outer mold, of an inner mold, means for moving the outer mold to and surrounding the inner mold and clamping it against the latter under pressure, and means for releasing the outer mold so clamped from its holder and maintaining the pressure on the inner mold and relieving said pressure and retransferring the outer mold to a holder, all of said operations being performed in succession automatically.

34. A shaping machine comprising a series of mold holders arranged in pairs on opposite sides of the center of the machine, a conveyer adapted to move between the pairs of holders along two paths, and means for moving the pairs of holders opposite either path.

35. A shaping machine comprising a series of mold holders arranged in pairs on opposite sides of the center of the machine, a conveyer adapted to move between the pairs of holders along two paths, means for moving the pairs of holders opposite either path, and means for intermittently moving the conveyer past the series of holders along both paths.

36. A shaping machine comprising a series of mold holders arranged in pairs on opposite sides of the center of the machine, a conveyer adapted to move between the pairs of holders along two paths, means for moving the pairs of holders opposite either path, means for intermittently moving the conveyer past the series of holders along both paths, and means for stopping the movement of the holders with respect to the paths of the conveyer when the conveyer is stopped.

37. A shaping machine comprising a series of mold holders arranged in pairs on opposite sides of the center of the machine, a conveyer adapted to move between the pairs of holders along two paths, and means for moving the pairs of holders opposite either path, the holders being adapted to contain outer molds and the conveyer being adapted to bring to them inner molds along one path.

38. A shaping machine comprising a series of mold holders arranged in pairs on opposite sides of the center of the machine, a conveyer adapted to move between the pairs of holders along two paths, and means for moving the pairs of holders opposite either path, the holders being adapted to contain outer molds and the conveyer being adapted to bring to them inner molds along one path, and combined inner and outer molds along the other path.

39. In combination, an inner mold, a sectional outer mold adapted to fit over the inner mold, a holder for the inner mold, a holder for the outer mold adapted to be reciprocated to and from the inner mold, devices for locking the outer mold on the inner mold, including hooks on the outer mold adapted to engage the inner mold, and means for actuating the hooks to cause their engagement and disengagement.

40. In combination, an inner mold, a sectional outer mold adapted to fit over the inner mold, a holder for the outer mold adapted to be reciprocated to and from the inner mold, devices for locking the outer mold on the inner mold, including hooks on the outer mold adapted to engage the inner mold, and means for actuating the hooks to cause their engagement and disengagement, said means comprising a cam within the holder.

41. In combination, an inner mold, a sectional outer mold adapted to fit over the inner mold, a holder for the outer mold adapted to be reciprocated to and from the inner mold, devices for locking the outer mold on the inner mold, including hooks on the outer mold adapted to engage the inner mold, and means for actuating the hooks to cause their engagement and disengagement, said means comprising a cam within the holder moved by the reciprocation thereof.

42. In combination, an inner mold, a sectional outer mold adapted to fit over the inner mold, a holder for the outer mold adapted to be reciprocated to and from the inner mold, devices for holding the outer mold on the inner mold, including hooks on the outer mold adapted to engage the inner mold, and means for actuating the hooks to promote such engagement.

43. In combination, an inner mold, a sectional outer mold adapted to fit over the inner mold, a holder for the outer mold adapted to be reciprocated to and from the inner mold, devices for holding the outer mold on the inner mold, including hooks on the outer mold and an annulus on the inner mold adapted to be engaged thereby, and means for actuating the hooks to promote such engagement.

44. In combination, an inner mold, an outer collapsible mold, a cage adapted to carry the latter, a holder for the cage, means for moving the holder to and from the inner mold, and means for removing the outer mold and cage from the inner mold, while the latter is in the holder, said means including the holder.

45. In combination, a conveying means for inner molds, holders for outer molds, each of said holders adapted to coöperate with the conveyer to bring an outer mold in position around an inner mold, and said holders including means whereby an outer mold held thereby may be gripped or released.

In testimony whereof I affix my signature in presence of two witnesses.

EDWARD J. NOBLE.

Witnesses:
ALAN C. McDONNELL,
MARY H. LEWIS.